United States Patent [19]

Kinnan

[11] Patent Number: 4,923,134
[45] Date of Patent: May 8, 1990

[54] SELF-PROPELLED SUBSOIL PENETRATING TOOL SYSTEM

[75] Inventor: Frank R. Kinnan, Camas Valley, Oreg.

[73] Assignee: Underground Technologies, Inc., Byron, Calif.

[21] Appl. No.: 300,942

[22] Filed: Feb. 24, 1989

Related U.S. Application Data

[62] Division of Ser. No. 115,487, Nov. 2, 1987.

[51] Int. Cl.⁵ ............................................. B65H 75/42
[52] U.S. Cl. ............................ 242/54 R; 242/86.5 R; 254/134.3 R; 175/103
[58] Field of Search ............ 242/54 R, 86.5 R; 254/134.3 R, 134.3 SC, 134.3 FT, 134.4; 175/103, 424

[56] References Cited

U.S. PATENT DOCUMENTS

| | | | |
|---|---|---|---|
| 3,539,123 | 11/1970 | Shutt | 242/54 R |
| 3,576,295 | 4/1971 | Hale | 242/54 R |
| 3,858,011 | 12/1974 | Salvin et al. | 242/54 R |
| 4,442,903 | 4/1984 | Schutt et al. | 254/134.3 FT |
| 4,570,705 | 2/1986 | Walling | 242/54 R |
| 4,830,300 | 5/1989 | Taylor et al. | 242/54 R |

Primary Examiner—John M. Jillions
Attorney, Agent, or Firm—David Teschner

[57] ABSTRACT

A means and method to pre-tension a cable or components thereof which provides an auxiliary reel mounted upon the primary cable reel, which auxiliary reel can be rotated independently of said primary cable reel and also rotated with said primary cable reel. The rotation of such auxiliary reel, when attached to a tension member, prior to rotation of the primary cable reel, pre-tensions, such tension member and said cable to limit rotation, deformation and distortion of the cable under preset conditions. The rotation of the auxiliary reel with the primary cable reel maintains such pre-tension regardless of whether the rotation of the primary cable reel increases such tension in the cable.

2 Claims, 15 Drawing Sheets

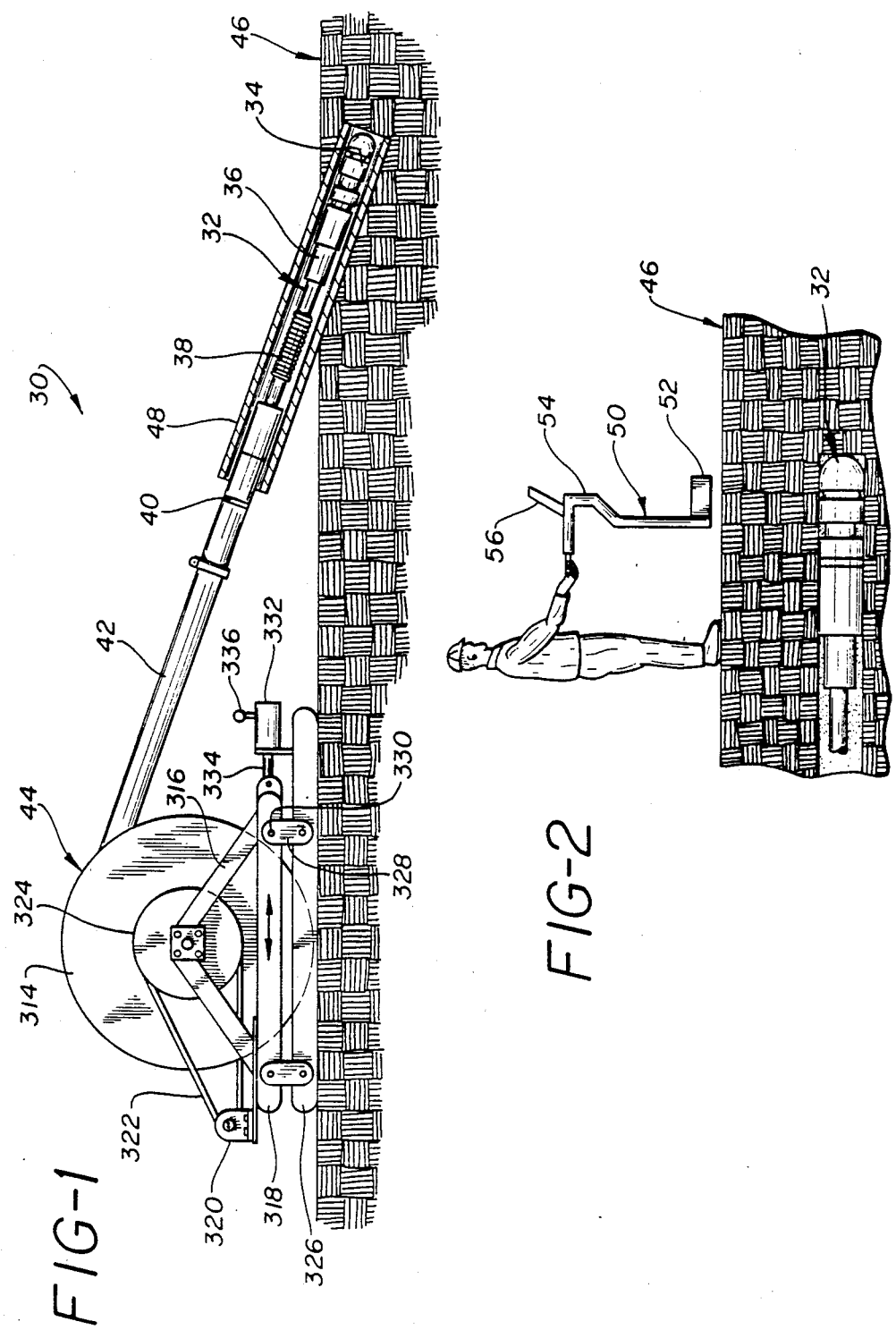

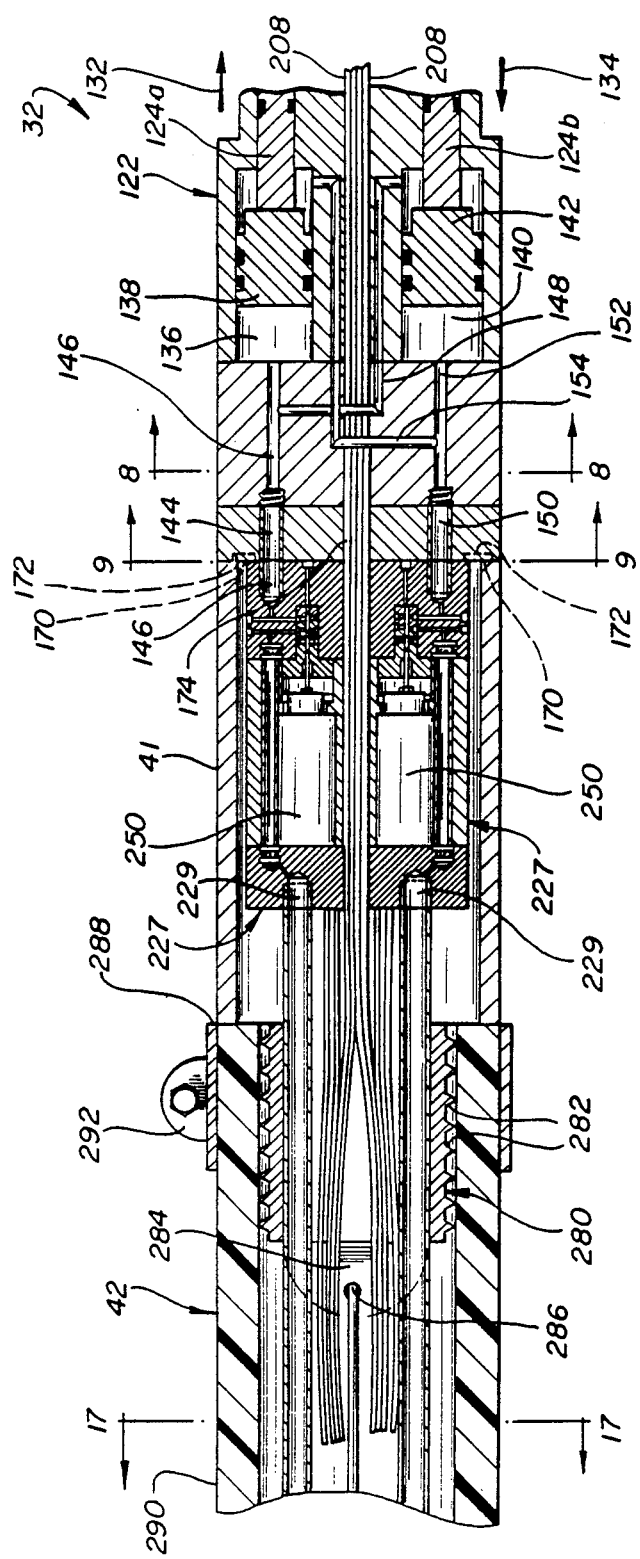

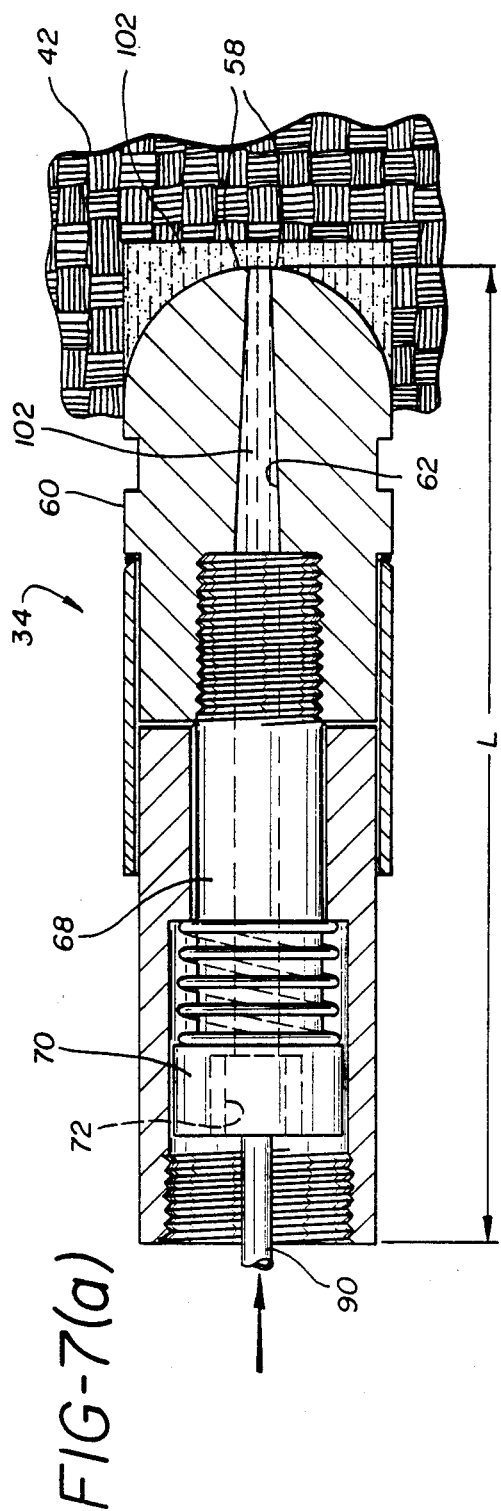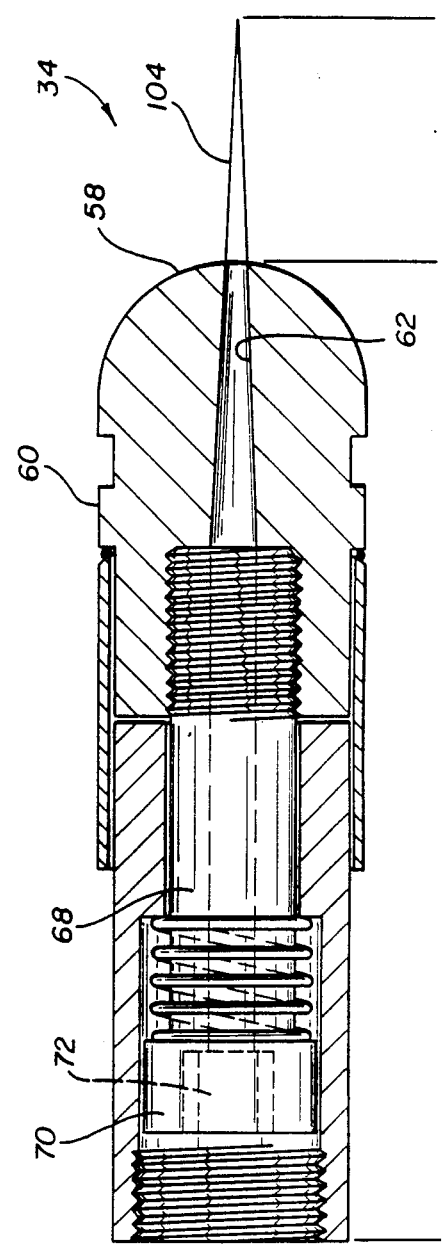
FIG-7(a)
FIG-7(b)

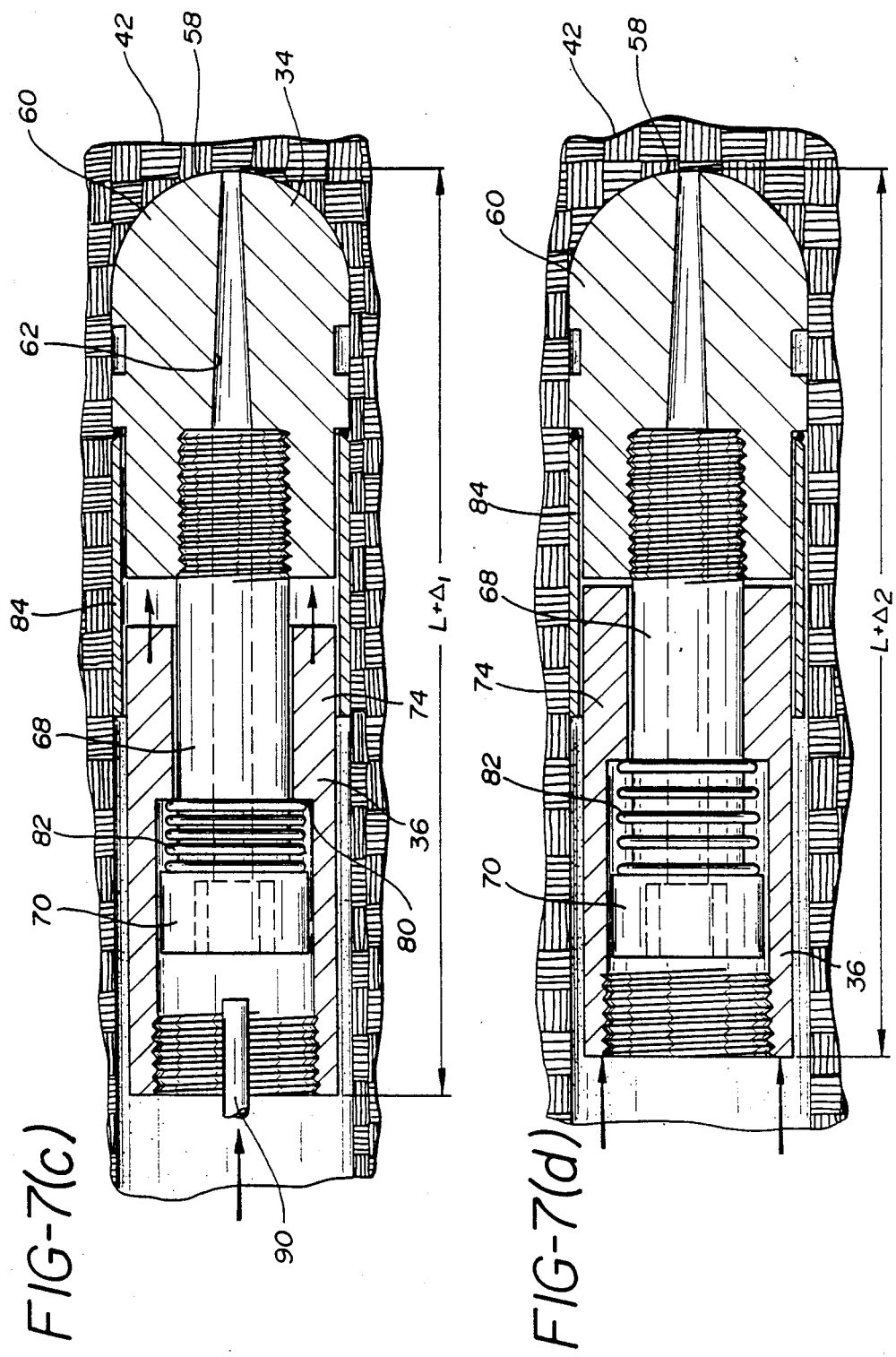

SELF-PROPELLED SUBSOIL PENETRATING TOOL SYSTEM

This is a division of application Ser. No. 07/115,987 filed Nov. 2, 1987.

BACKGROUND OF THE INVENTION

1. Field of the Invention:

The invention is directed to the field of subsurface trenching for the installation and removal of various utility items such as electrical cable, conduit, water pipes; sewer pipes and the like where same must be mounted below surface for their protection from the environment and populace and to hide their otherwise unsightly appearance.

2. Description of the Prior Art:

The usual method for the laying or removal of utility items such as electrical cables, conduit, water pipes, sewer pipes and the like is to cut or dig a straight sidewall trench of the appropriate depth, lay the cable, conduit or pipe at the trench bottom and cover it up with the soil removed during the trench formation.

When the land is, undeveloped, that is has no structures, plantings, parking lot, etc., upon it, it is a simple matter to cut or dig the trench using mechanized equipment such as trenchers, front loaders, bulldozers or the like, or, if desirable, to manually dig the trench.

However, when the land has been improved as by the building of structures upon the land surface or the surface has been covered as in a parking lot or where gardens and plantings have been placed on the land, installation, removal and/or replacement of utility items is both slow and expensive. Often, space and access limitations prevent any methods other than manual trenching from being used and, in addition to the work itself, there is the disruption of land use and the expense of restoring the trenched area to its former appearance.

In an effort to minimize surface disruption and minimize the costs of surface reconstruction, it has been suggested that a device be constructed to burrow beneath the surface of land and create a bore into which cable, conduit, pipe or the like could be inserted without disturbing the surface of the land or those structures or details thereon. A first type of device was created to permit the replacement of electrical cables and used those cables to guide their movement through the soil which was removed by means of one or more fluid jets. The old cable was pulled from the bore and a new one inserted. A tool of this type is shown in U.S. Pat. No. 4,385,667 issued May 31, 1983 and in U.S. Pat. No. 4,403,667 issued Sept. 13, 1983.

Although this type of device works well for previously installed electrical cable replacement, it is not suitable for new cable installation because there is no cable to follow and thus no means to independently guide the tool.

U.S. Pat. No. 4,306,627 issued Dec. 22, 1981 shows and describes a tool which can be used for a new installation. A rotating fluid jet drilling nozzle is advanced by a pipe string in much the same manner as a rock drill is employed to dig oil or gas wells. Despite mechanisms to control the position of the nozzle, as is shown in U.S. Pat. No. 4,674,579 issued June 23, 1987, it is still difficult to steer the boring head mounted at the end of a generally rigid pipe string required to push and advance the boring head.

The use of a totally independent tool such as shown in U.S. Pat. No. 3,326,008 issued June 20, 1967 presents different problems. Because it must rely upon only its own drilling head, it is limited as to how fast it can advance and the type of subsoil it can burrow through. Also, since it carries internally the cable it lays, it is limited in its utility. Also, its inability to reverse and retrace the bore it makes limits its ability to draw new cable, conduit or pipe back through the bore. The device must always exit the soil to be recovered and used again.

SUMMARY OF THE INVENTION

The instant invention overcomes the difficulties noted above with respect to prior art devices for installing, removing and/or replacing existing utility items by providing a fluid-operated self-propelled subsoil penetrating tool of the type including an elongated housing member having a penetrating nose portion capable of ejecting a jet of liquid under high pressure to break up and disrupt the subsoil adjacent such nose portion followed by a two-component hammering of such soil to displace and compact the subsoil as the tool advances. Remotely-operated steering mechanisms control the path of the tool while remotely-read instruments denote the position, depth, direction and attitude of the tool. A trailing umbilical cord provides all motive and operational fluids and electrical power while transmitting instructions and data between the tool and the remote control station. A unique internal structure of two counter-rotating rings of fiberglass rods and a central steel cable reduces the rotation of the tool as it advances and allows for the reverse directional movement of the tool and utility items through the bore created by the movement of the tool through the subsoil.

Interchangeable nozzles may be placed on the nose portion in accordance with the type of subsoil through which the nose is progressing, to get maximum subsoil breakup and disruption. The usual front burrowing nose portion can be replaced with a back reamer to operate the tool in the reverse direction back along the bore while enlarging the diameter of same.

Using a combination of mercury switches with remote read-out and two trim tab indicators, the orientation, azimuth, attitude and depth of the penetrating nose can be determined and the azimuth confirmed by means of an external cable locater positioned above ground and above the submerged nose portion. Signals fed from the control panels in response to the operation of joy stick controllers guide the nose portion to avoid obstructions in the subsoil and cause the nose portion to traverse the desired path. A rotatable panel on the control panel accounts for changes in orientation or rotation of the nose portion and alters the meanings of the joy stick controls to insure that the nose portion follows the desired path.

The feed reel for the umbilical cord carries a separate reel to pre-tension the core steel cable and is itself mounted upon a carriage to measure the tension applied to the umbilical cord as it is withdrawn from the bore.

It is an object of this invention to provide a fluid-operated self-propelled subsoil penetrating tool.

It is another object of the invention to provide a fluid-operated self-propelled subsoil penetration tool which employs a fluid jet and fluid-propelled hammering to create a bore and propel the tool along such bore.

It is another object of the invention to provide a fluid-operated self-propelled subsoil penetration tool which employs fluid-propelled hammering to propel the tool back along a previously made bore while enlarging same.

It is still another object of the invention to provide a fluid-operated self-propelled subsoil penetration tool which employs a fluid jet and fluid-propelled hammering to create a bore and propel the tool along such bore and which further employs fluid-propelled hammering to propel the tool back along a previously made bore while enlarging same.

It is another object of the invention to provide a remotely-operated steering mechanism for a fluid-operated self-propelled subsoil penetration tool.

It is still another object of the invention to provide a remotely-read display which describes the orientation, azimuth and attitude of a fluid-operated self-propelled subsoil penetration tool.

It is still another object of the invention to provide a remotely-read display which describes the orientation, azimuth and attitude of a fluid-operated self-propelled subsoil penetration tool and a control panel changeable in response to the orientation to delimit the functioning of a remotely-operated steering mechanism to permit the tool to be correctly steered along a desired path.

It is yet another object of the invention to provide a display at a remote read-out point consisting of a series of lamps each operated by a mercury switch located upon a fluid-operated self-propelled subsoil penetration tool to indicate the orientation of the tool with respect to an initial reference.

It is still another object of the invention to provide a combination of an above-surface detector and remotely-indicating means to determine the depth, orientation, azimuth and attitude of a fluid-operated self-propelled subsoil penetration tool.

It is yet another object of the invention to provide a service cable containing all fluid and hydraulic lines and electrical conductors needed for the operation of a self-propelled subsoil penetration tool which substantially prevents rotation of said tool as it advances.

It is still another object of the invention to provide a self-propelled subsoil penetration tool service cable using a belt of fiber glass rods which substantially prevents rotation of said tool as it advances.

It is another object of the invention to provide a self-propelled subsoil penetration tool service cable which substantially prevents rotation of said tool as it advances by using two concentric counter-wound belts of fiberglass rods.

Yet another object of the invention is to provide a self-propelled subsoil penetration tool service cable which substantially prevents rotation of said tool as it advances by using two concentric, counter-wound belts of fiberglass rods and a central steel wire.

Still another object of the invention is to provide a self-propelled subsoil penetration tool service cable which substantially prevents rotation of said tool as it advances by using two concentric, counter-wound belts of fiberglass rods and a pre-tensioned central steel wire.

It is an object of the invention to provide a reeling device for the service cable of a self-propelled subsoil penetration tool which controls the tension in such cable as it is wound upon such reeling device.

It is yet another object of the invention to provide a reeling device for the service cable of a self-propelled subsoil penetration tool which controls the tension in such cable as it is wound upon such reeling device and further includes a complementary reeling device to pretension the steel wire in the service cable during both the reeling and unreeling of the service cable.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

In the drawings in which similar elements are given similar reference characters:

FIG. 1 is a side elevational view, partially in section, of a self-propelled subsoil penetration tool system, constructed in accordance with the concepts of the invention being applied.

FIG. 2 is a fragmentary, side elevational view, partially in section, of the penetration tool of FIG. 1 burrowing in subsoil and detected by an operator holding a cable locator according to the concepts of the invention.

FIGS. 4(a) and 4(b) are side elevations of the tool of FIGS. 3(a) and 3(b), in section, taken along the lines 4a—4a and 4b—4b in FIGS. 3(a) and 3(b) respectively, to show the internal details of the penetration tool portion.

FIG. 7(a) is a side elevation, in section, of the nose and hammer portions of the penetration tool of FIG. 1 in their initial positions.

FIG. 7(b) is a side elevation, in section, of the nose and hammer portions of the penetration tool of FIG. 1 with the nozzle shown ejecting a fluid jet.

FIG. 7(c) is a side elevation, in section, of the nose and hammer portions of the penetration tool of FIG. 1 with the nose position shown in its foremost position with respect to the hammer portion during its ram movement forward a distance $\Delta_1$.

FIG. 7(d) is a side elevation, in section, of the nose and hammer portions of the penetration tool of FIG. 1 showing the positions of the nose and hammer portions after the hammer stroke has been completed and both portions advanced a distance $\Delta_2$.

FIG. 18 is a side elevation, in section, of a back reamer installed in place of the nose and hammer portions of the self-propelled subsoil penetrating tool system of FIG. 1.

DESCRIPTION OF THE PREFERRED EMBODIMENTS

Figure 3A:
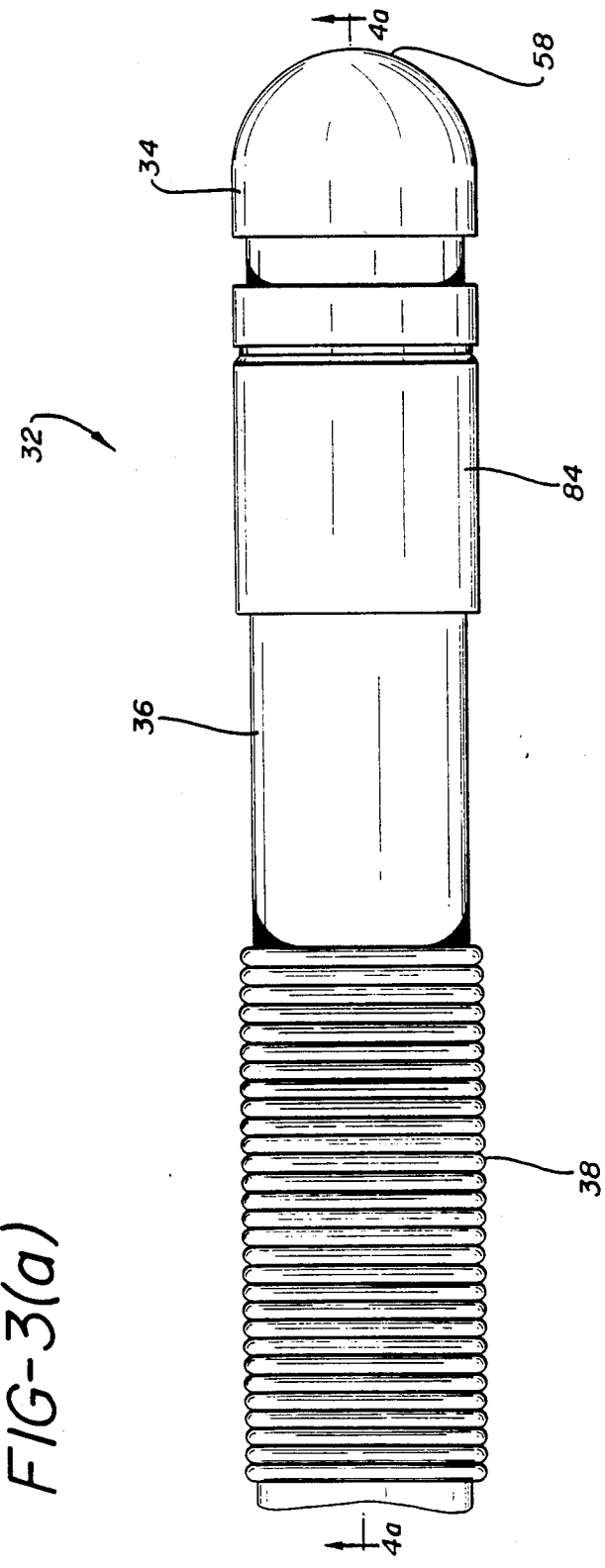
FIGS. 3(a) and 3(b) are enlarged side elevations of the self-propelled subsoil penetration tool of FIG. 1 with the reeling mechanism removed and only a portion of the service cable shown.

Turning now to FIGS. 1 and 2, there is shown a self-propelled subsoil penetrating tool system 30 constructed in accordance with the concepts of the invention. System 30 is made up of a boring unit 32 which includes a nose portion 34, a hammer portion 36, a steering portion 38 and an indicator portion 40 mounted to one end of a service cable 42 through which pass all fluid supply lines, hydraulic lines, electrical conductors and a steel wire and fiberglass rods to minimize rotation of the boring unit 32. The service cable 42 is reeled and unreeled from a cable reeling system 44 which provides means to control the tension applied to service cable 42 during re-reeling and to the steel wire in the service cable 42 during both reeling and unreeling. The boring unit 32 is injected into subsoil 46 by means of a guide tube 48, the front end of which is inserted into a hole dug in the subsoil 46 and the back end of which rests on top of the soil. Once burrowing has been initiated and the boring unit 32 has left the guide tube 48, the position of the boring unit 32 is determined by the use of a hand-positioned cable locator 50 of the type made by Metro Tech of 670 National Avenue, Mountain View, California 94043--Model 850 Radio Frequency Tracer. Cable locator 50 includes a probe portion 52 positioned above the soil surface over the boring unit 32 by the extended handle 54 carried by an operator who moves probe portion 52 to maximize the readings on the display 56 which shows the depth below the surface of the boring unit 32 and its azimuth or direction in a plane parallel with the horizon and using north as its reference. The orientation and attitude of the boring unit 32 will be determined from other devices as will be described below.

Figure 3B:
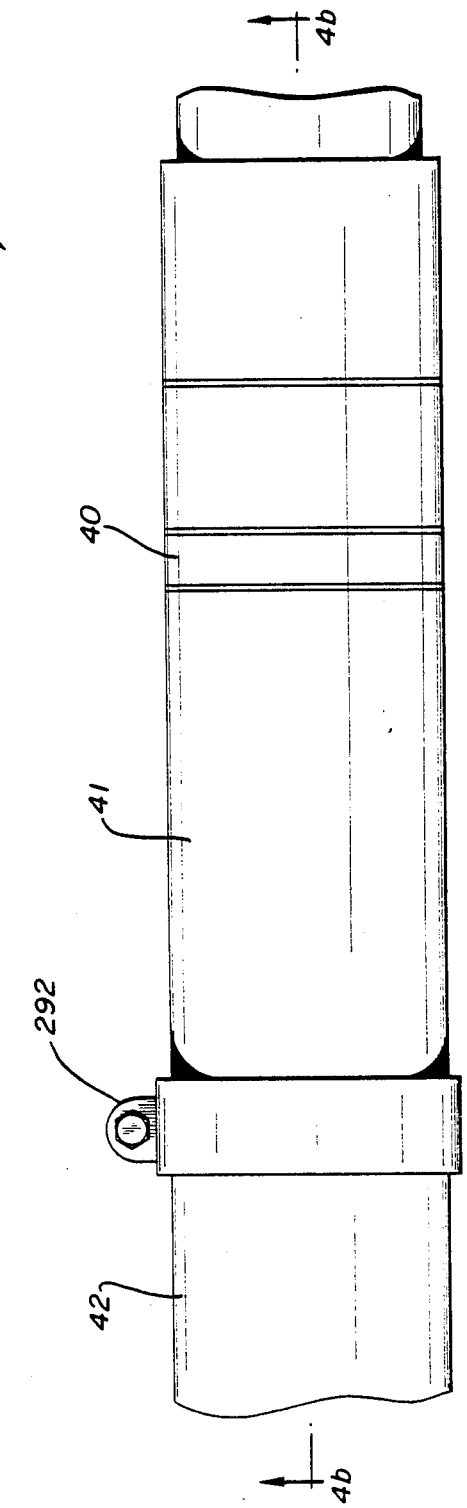

The overall configuration of the boring unit 32, as is best seen in FIGS. 3(a) and 3(b), is that of an elongate cylinder having a generally smooth and continuous outer surface. The leading surface 58 of nose portion 34 is generally hemispheric presenting a somewhat bulky profile, but sufficiently rounded to permit the soil through which it passes to be deflected outwardly away from such leading surface 58. Pointed or more conical leading surfaces pass through soil more easily but tend to be deflected from their paths by engagement with rock, debris or other hard matter in their path. The bulkier pattern chosen tends to limit such deflections while only minimally adding to the through-soil resistance of the nose portion 34. The steering mechanism is located within steering portion 38 which is comprised generally of a corrugated tube to permit the nose portion 34 and hammer portion 36 to be redirected with respect to the remainder of boring unit 32 and thus change the direction of the boring operation.

Figure 4A:
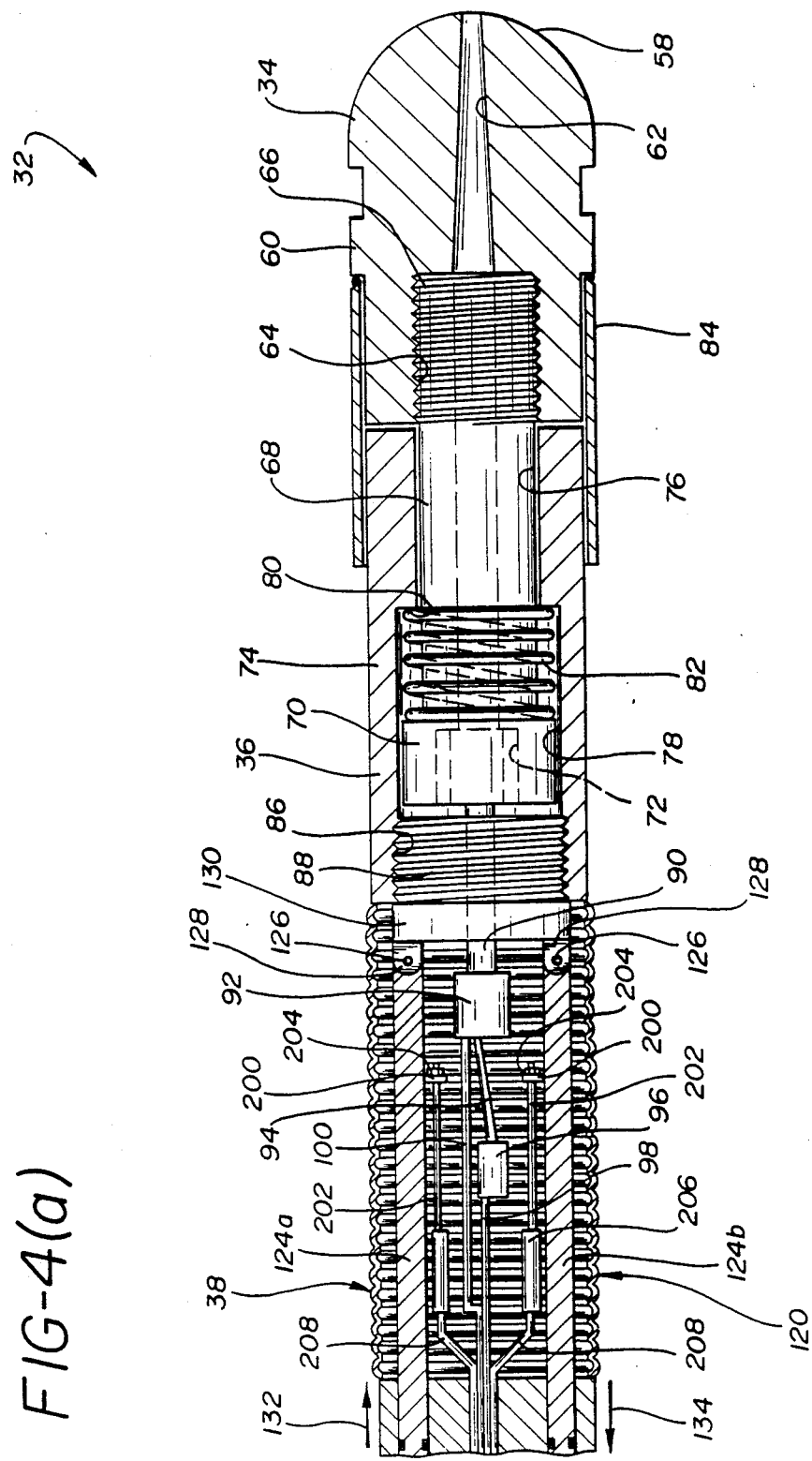

The functioning of boring unit 32 can best be appreciated from FIGS. 4(a) and 4(b) which are sectional views of the overall boring unit 32. Nose portion 34 consists of the nozzle body 60 having a tapered nozzle 62 extending therethrough and through leading surface 58. The opposite end of nozzle body 60 is internally threaded as at 64 to receive the externally threaded portion 66 of piston 68 which includes a piston head 70 with expansion chamber 72 therein. Piston 68 is mounted within hammer portion body 74 which contains a first bore 76 to accommodate the piston 68 and an enlarged bore 78 to accept the piston head 70. The interface between bore 78 and the smaller bore 76 provides a shoulder 80 which acts as a forward stop for the piston head 70 movement. A compression spring 82 is maintained between shoulder 80 and the lower surface of piston head 70. A shield 84 overlies the separation between nozzle body 60 and hammer portion body 74 to prevent soil or debris from entering when these bodies are separated as will be discussed below.

Hammer portion body 74 is internally threaded as at 86 to receive the externally-threaded stud 88 of steering portion 38. A fluid feed tube 90 passes through stud 88 to a position adjacent the expansion chamber 72 in piston head 70. Drilling mud or a bentonite slurry at about 225 pounds per square inch is fed via tube 98 through check valve 96 to a further tube 94 to valve 92. The valve 92 operates to allow a slow continuous oozing of the drilling mud into expansion chamber 72, the nozzle 62 and out of nose portion 34 about the leading surface 58. This pool 102 of drilling mud [see FIG. 7(a)] serves to lubricate the nose portion 34 and is available for mixing with the disturbed and disrupted soil as it is deflected away by passage of the nose portion 34. The movement of the boring unit 32 tends to compact the soil and the presence of the drilling mud as a binding agent tends to preserve the walls of the newly-formed bore and prevent their inward movement to fill same.

The valve 92 is also fed air at high pressure of between 4,000 and 5,000 pounds per square inch at a pulsed rate of between 5 to 40 pulses per second depending upon the type and consistency of the subsoil 46. It has been found that generally a pulse rate of 20 per second works well for average subsoil 46. The pulse rate is also limited by the ability to fill the nozzle 62 and expansion chamber 72 between air pulses. The pulsed, high-pressure air admitted to valve 92 by tube 100 is passed to the drilling mud in expansion chamber 72 in piston head 70. Since the inlet air is maintained at a constant pressure, the force applied to the piston 68 will be multiplied by the ratio of the area of the expansion chamber 72 to the area of the fluid feed tube 90. This pulse of high-pressure air will have two effects. First, there will be a high-pressure jet of fluid 104 [see FIG. 7(b)] like a projectile discharged from nozzle 62 to the subsoil 46 adjacent leading surface 58 to disturb, disrupt and mulch such soil. The great force which the discharge from the nozzle 62 can exert despite great distances from the source pumps is due to the use of the high-pressure air. This disruption will occur for some distance J from leading surface 58 depending upon the soil, its composition, presence of rock or other solid material or debris and the shape of the nozzle 62 employed. It has been found that the distance J is about one to four inches, generally between two and three inches. Some of the subsoil will be compacted ahead of leading surface 58 and some will be distributed into the bore about boring unit 32. Next, the entire nozzle body 60 will be pushed forward by the application of the high-pressure air to the piston head 70. Although these actions have been described as separate events for the sake of clarity, they actually occur almost simultaneously.

The movement of nozzle body 60 forward further displaces, disrupts and compacts the subsoil 46. The stroke of the nozzle body is generally in the order of 0.5 inches to 4 inches with the preferred value being about 0.75 inches. As is shown in FIG. 7(c), nozzle body 60 has moved forward a distance of $\Delta_1 =$ to 0.75 inches. The remainder of boring system 30 effectively provides the anchor for nozzle body 60 for its forward motion. As shown in FIG. 7(c), the forward movement of nozzle body 60 has separated it from hammer portion body 74 and caused compression spring 82 to be compressed between stop shoulder 80 and the lower surface of piston head 70. No soil or other debris will enter the separation between bodies 60 and 74 because of shield 84.

Because of the continuous feeding of the service cable 48 and the anchoring of the nozzle body 60 in the subsoil 46, the expansion of the compression spring 82 causes hammer portion body 74 to be propelled forward, striking the nozzle body 60 with sufficient force to advance it further through subsoil 46. The total advance of nozzle body 60 through subsoil 46 is thus a distance $\Delta_2$ as shown in FIG. 7(d). The length of $\Delta_2$ is in the range of two to four inches including the initial stroke of nozzle body 60. As is shown in FIG. 7(d), all components of the boring unit 32 are now in their initial position awaiting another high-pressure air pulse. The action just described is repeated at the preferred rate of 20 per second as above set out.

The nozzle body 60 of FIGS. 4 and 7(a) to (d) has a tapered nozzle 62 and is generally of the long taper-short focused type meaning that the jet stream tends to be focused to a point beyond the nozzle. The internal taper of the nozzle causes the viscous drilling mud to form a plug which is fired out as a projectile when the pulse of high-pressure air is applied. This design provides the most penetration in hard soils and the degree of taper governs the side wall penetration. This design is most universal, similar to an irrigation nozzle and will be used in most applications. For other applications, where there is a desire to maximize the bore speed and reduce boring time, other nozzles could be used. The operator could have a series of nozzle bodies each with a distinct nozzle configuration and select and install the correct one before beginning the boring operation. The relatively large nozzle 62 also permits the application of soil-stabilizing materials to the disrupted and displaced subsoil. Such materials could be chopped fiberglass to be mixed with soils such as round river rock to support the bore walls and prevent collapse. The material is added to the drilling mud at the supply point.

Figure 5:
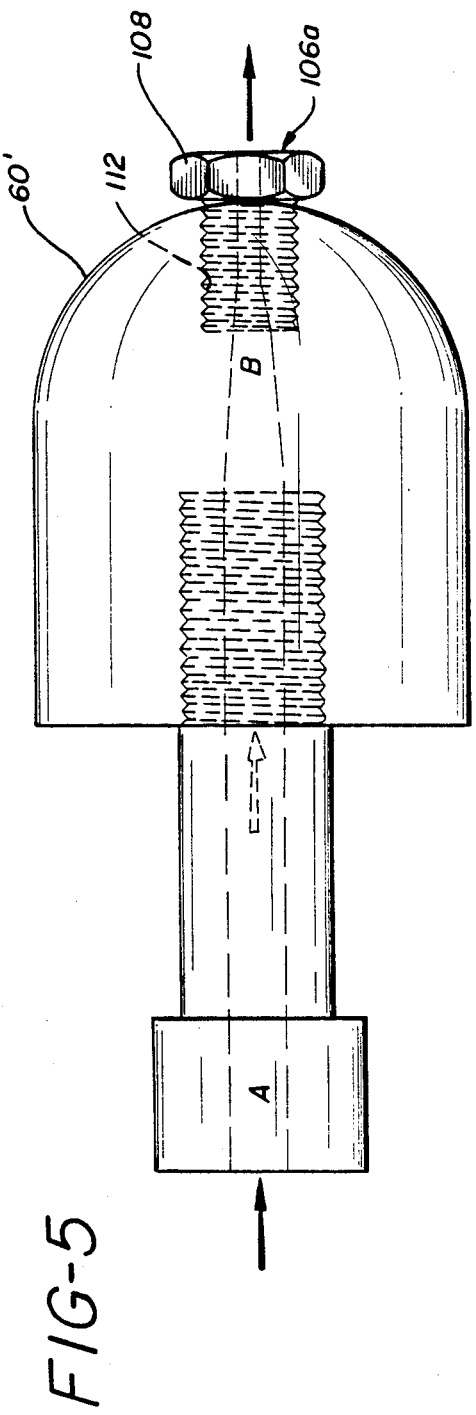
FIG. 5 is a side elevation of an alternative nose portion for a self-propelled subsoil penetration tool which permits the substitution of various nozzles to match the characteristics of the subsoil through which the nose burrows or the use of a pulling eye to draw a new cable, conduit or pipe behind a retreating penetration tool.
Figure 6:
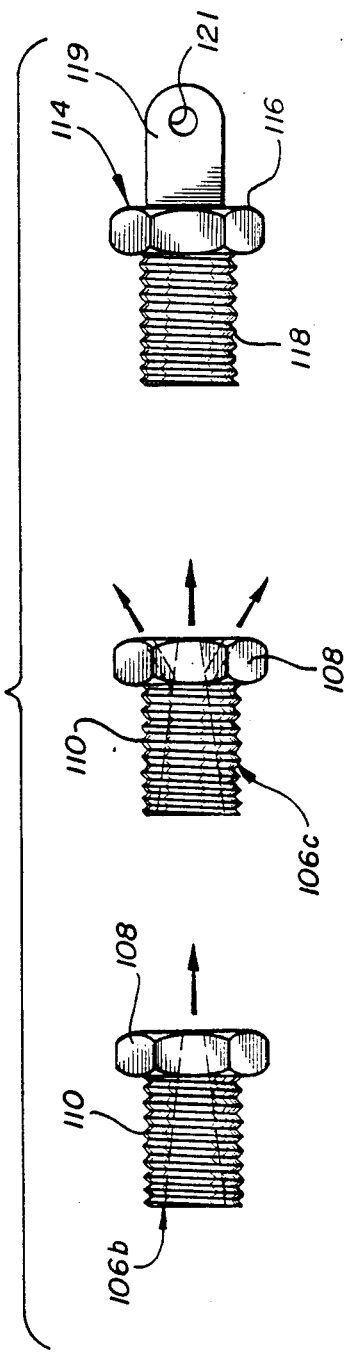
FIG. 6 are side elevations of alternative nozzles and a pulling eye to be used with the nose of FIG. 5 in accordance with the concepts of the invention.

Alternatively, nozzle body 60' as shown in FIG. 5 could be employed. Nozzle body 60' has interchangeable nozzle outlets 106(a), 106(b) and 106(c) which, as shown in FIG. 6, are generally in the form of a bolt with a hexagonal wrenchflat head configuration 108 and an externally-threaded body portion 110 arranged to mate with the internally-threaded aperture 112 in nozzle body 60'. Within the shank and head of the bolt, there is formed the desired nozzle outlet configuration which serves as a continuation of what was nozzle 62 in FIG. 4. Nozzle 106(b) of FIG. 6 is the short-focused type as was shown in FIG. 4. Nozzle 106(a) of FIG. 5 is of the short-taper-long-exit type which breaks up the stream diffusing the drilling mud for close mixing in granular, loose subsoil formations. The long continuous narrow taper with multiple holes, as is shown by nozzle outlet 106(c) of FIG. 6, works best in hard, cohesive soils such as dry clay where deeper side wall penetration is desired. Also, since the boring unit 32 is often used to pull a new cable, conduit or pipe through the newly-created bore, it is advantageous to provide a pulling eye to which the new utility item can be fastened for movement through the bore. A convenient pulling eye 114 is shown at the bottom of FIG. 6. Pulling eye 114 is in the shape of a bolt with a hexagonal wrench-flat head 116 and a threaded shank 118 to engage threaded aperture 112 of nozzle body 60'. A plate 120 with aperture 121 therethrough is attached to the head 116 of pulling eye 114. To pull a utility item through the bore as the boring unit 32 is withdrawn, it has only to be attached using aperture 121 of pulling eye 114.

Steering is accomplished by the steering portion 38 which has two main sections: corrugated tubing portion 120[FIG. 4(a)] and solid block portion 122[FIG. 4(a)]. Within tubing portion 120 are the steering links for horizontal and vertical movement. Link pairs working in opposite directions insure controlled, parallel operation not possible with single links. It should be noted that FIGS. 4(a) and (b) show the pair of links 124 (a) and (b) which control the vertical movement of nozzle portion 60. The link pair which controls horizontal movement has been removed for the sake of clarity and normally would be located on a plane perpendicular to the drawing sheet and midway between links 124 (a) and (b). Links 124(a) and 124(b) are connected by pins 126 to the ears 128 of yoke 130 which is a part of the threaded stud 88 which engages the threaded portion 86 of the hammer portion body 74. To move the nozzle body 60 downwardly towards the bottom of FIG. 4(a), link 124(a) is moved to the right of the figure as shown by arrow 132 while link 124(b) is moved to the left of the figure as shown by arrow 134. The result is to rotate yoke 130 in a clockwise direction pointing nozzle body 60 downwardly.

Figure 8:
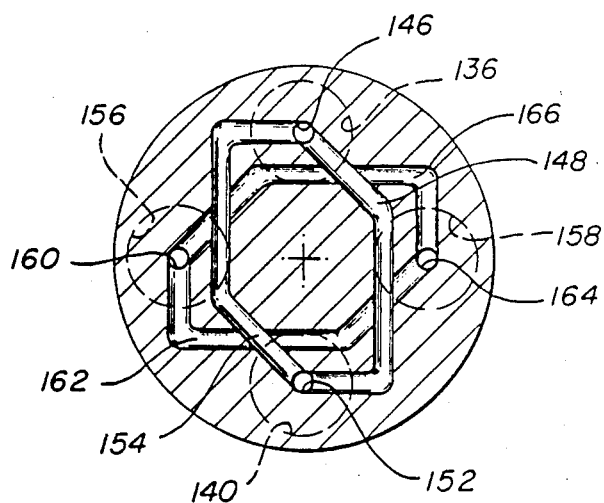
FIG. 8 is a rear elevation, in section, of the steering valve ducting system taken along the lines 8—8 in FIG. 4(b).

Movement of links 124(a) and 124(b) is controlled by the pistons in cylinders formed in solid block portion 122. Cylinder 136 contains piston 138 to which link 124(a) is attached while cylinder 140 contains piston 142 to which link 124(b) is attached. Each of the pistons 138 and 142 are double acting and can be driven in either direction by properly-admitted fluid. To insure that the pistons operate in correct directions, the fluid ducting and ports are arranged in pairs as is shown in FIGS. 4(b) and 8.

To operate links 124(a) and 124(b) to move the nozzle body 60 downwardly, fluid is introduced at inlet port 144 which is applied via duct 146 to cylinder 136 behind piston 138 forcing it in the direction of arrow 132. At the same time, fluid from inlet port 144 passes via duct 148 into cylinder 140 ahead of piston 142 forcing it in the direction of arrow 134. Link 124(a) is thus moved in the direction of arrow 132 while link 124(b) is moved in the direction of arrow 134, thus moving the nozzle body 60 downwardly. Introducing fluid at inlet port 150 applies fluid via duct 152 to cylinder 140 and the back end of piston 142. Fluid also goes via duct 154 to cylinder 136 ahead of piston 138. The net effect is to move nozzle body 60 upwardly in FIG. 4(a). The horizontal movement is similarly controlled by cylinders 156 and 158 and ducts 160, 162, 164 and 166.

Unlike those boring systems using a rotating cutting head at the end of a rigid pipe string, the boring unit 32 is joined to a flexible cable which it pulls along as it advances. Thus, the boring unit 32 is capable of rotation and misorientation with respect to azimuth and attitude. Also, since the remote controls presume a certain basic orientation, in order for them to be operated properly, the operator must know where the boring unit actually is, its orientation, azimuth, attitude and depth. As mentioned above, an operator using a radio frequency tracer 50 can determine the depth and azimuth of the boring unit 32. Conceivably, by comparing consecutive readings he can tell whether boring unit 32 is moving toward or away from the surface, and by using trigonometric function tables can determine the attitude of boring unit 32. This, however, is an after-the-fact determination and not one that can be used to steer the boring unit 32.

Figure 9:
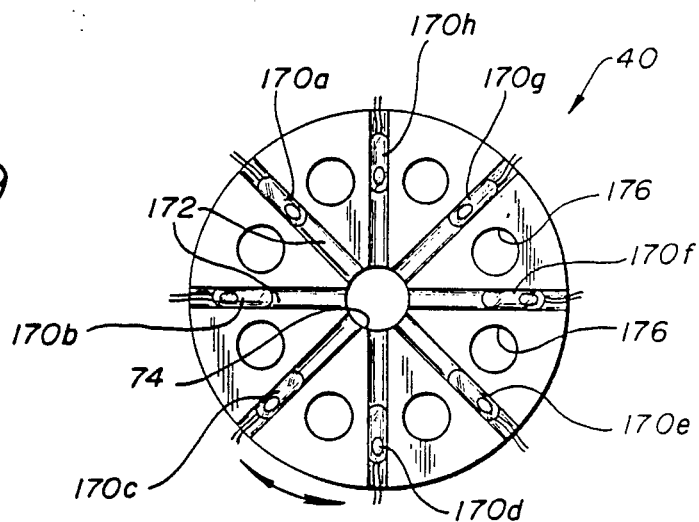
FIG. 9 is a rear elevation of the mercury switch detectors taken along the lines 9—9 of FIG. 4(b).

To determine the orientation and attitude of the boring unit 32, and because of the method of making these determinations to verify the azimuth, the instant invention makes use of a series of mercury switches and coil potentiometers mounted on the boring unit 32 and indicator lights and trim tab indicators mounted upon the remote control panel. The mercury switches 170 are mounted in indicator portion 40 in a series of radially, outwardly-extending recesses 172 as is seen in FIG. 9. Extending through the center of portion 40 is an aperture 174 and between the recesses 172 further apertures 176 to permit the passage therethrough of the various hydraulic and fluid lines and electrical conductors.

Figure 10:
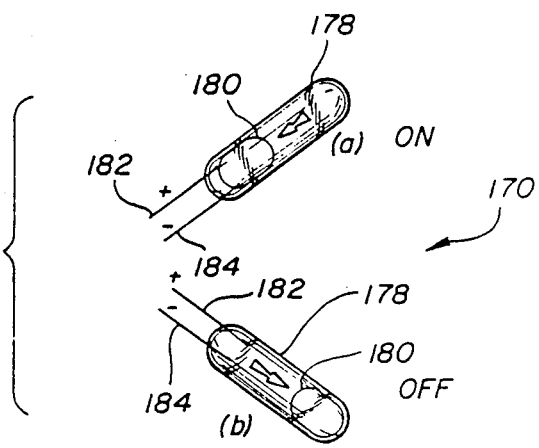
FIG. 10 is a diagrammatic representation of the functioning of the mercury switches of FIG. 9.

As is seen in FIG. 10, the mercury switches 170 are constructed in the form of a glass or plastic vial 178 containing a glob of mercury 180. The ends of two electrodes 182, 184 extend into the vial 178. When the vial 178 is directed downwardly as in FIG. 10(b), the mercury glob 180 is at the end of the vial 178 remote from electrodes 182, 184 leaving the circuit open and off. When the vial 178 is directed upwardly, as shown in FIG. 10(a), the mercury glob 180 bridges the electrodes 182, 184 completing the circuit and rendering the circuit on.

Figure 11:
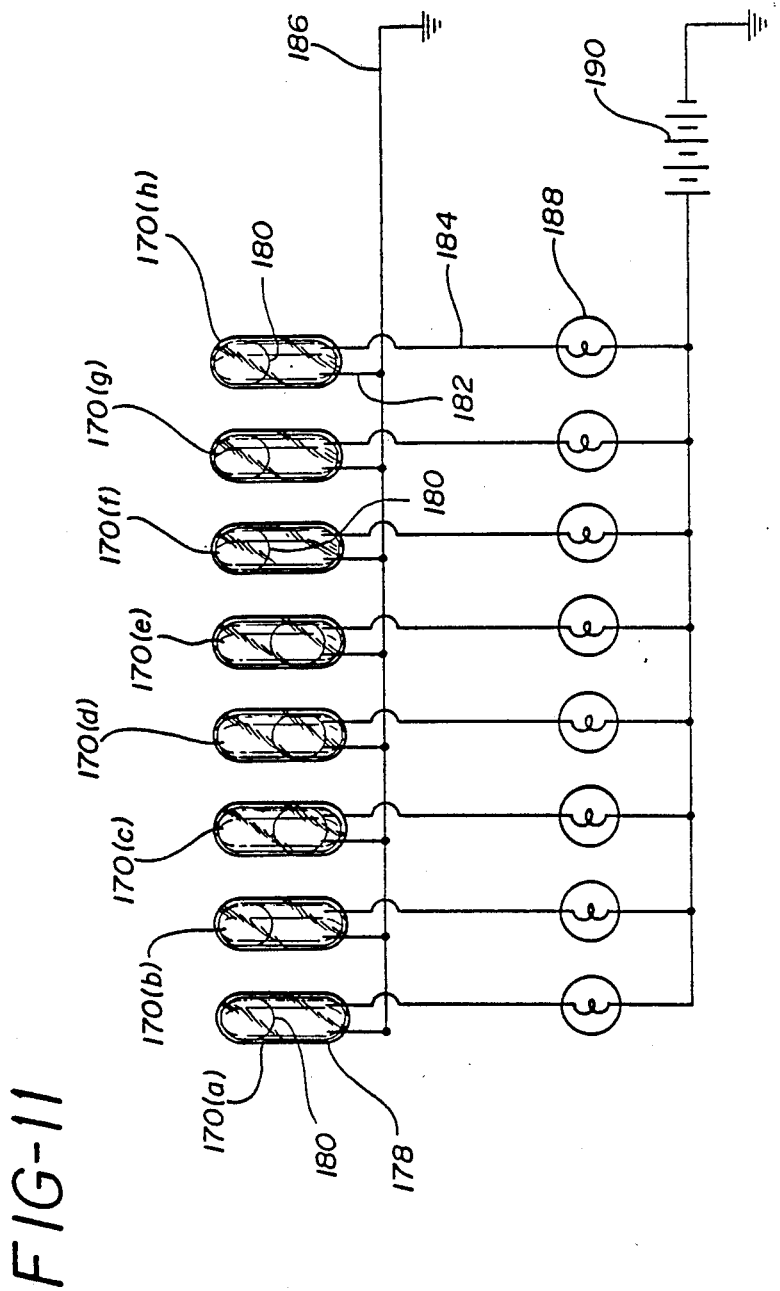
FIG. 11 is a schematic drawing of the electrical circuit between the mercury switches of FIG. 9 and the lamps of the control panel of the instant system.

FIG. 11 shows a typical electrical circuit arrangement for the mercury switches and display panel indicator lights. Each of the electrodes 182 is connected to ground by bus bar 186. Each of the electrodes 184 is connected to an indicator light 188 mounted upon the control panel 192 of FIG. 12. The opposite sides of indicator lights 188 are connected to the positive terminal of battery 190 whose negative terminal is also grounded. Mercury switches 170(c), 170(d) and 170(e) are each in the "on" condition and cause indicator lights 188(c), 188(d) and 188(e) to be lit showing that boring unit 32 is in its desired initial orientation. In the event the boring unit rotates 90° counter-clockwise, the mercury glob 180 in switches 170(a), 170(b), 170(d) and 170(e) shift, closing switches 170(a) and 170(b) but opening switches 170(d) and 170(e). As a result, indicator lights 188(a) and 188(b) will be lit and lights 188(d) and 188(e) extinguished. The control panel 192 will now indicate the 90° counter-clockwise rotation by the presence of the lit indicator lights 188(a), 188(b) and 188(c) as is shown in FIG. 13.

Figure 12:
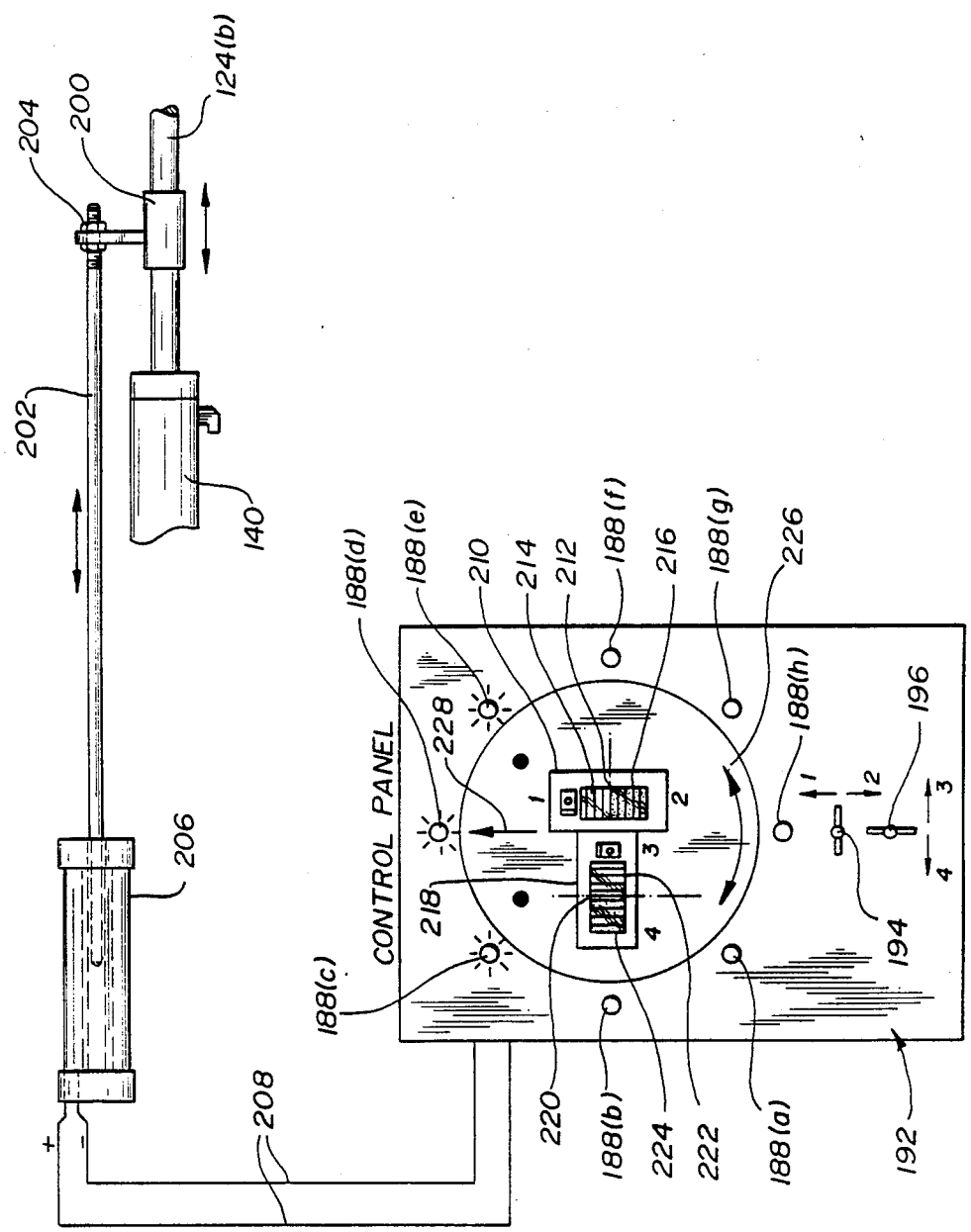
FIG. 12 is a diagrammatic representation of the steering sensors and the control panel of the instant system.
Figure 13:
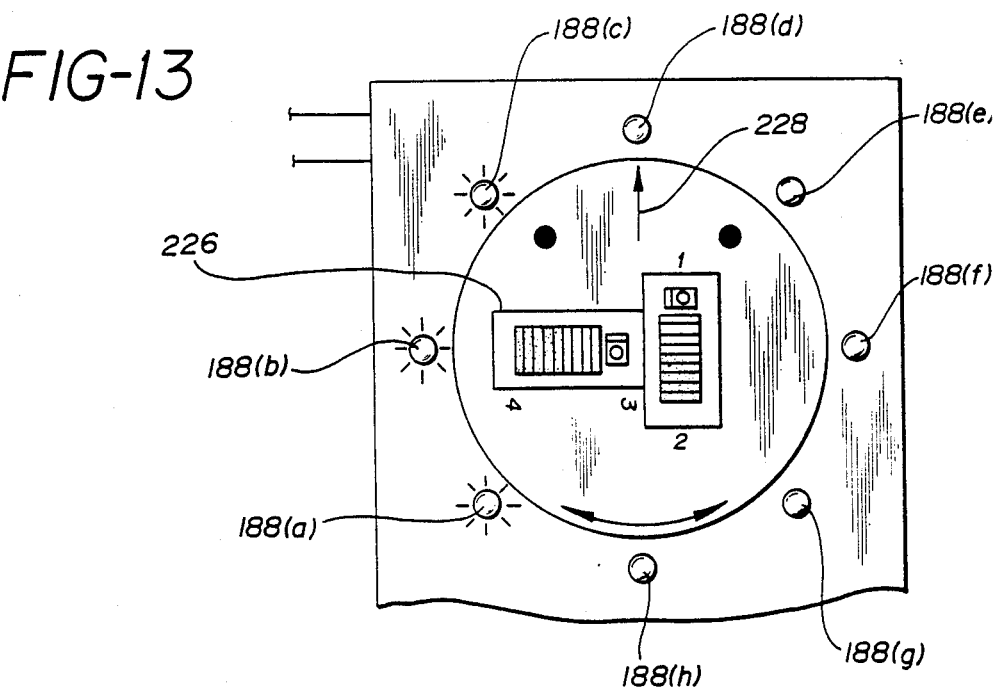
FIG. 13 shows the control panel of FIG. 12 indicating a changed orientation of the penetrating tool of FIG. 1.

The movement of the boring unit 32 is controlled by joy stick 194 for up and down shown by the arrows 1 and 2 on control panel 192, and joy stick 196 for right and left shown by the arrows 3 and 4 on control panel 192 of FIG. 12. Electrical signals generated in response to the movements of joy sticks 194 and 196 operate the solenoid controlled valves to cause fluid to flow into the appropriate cylinders 136, 140, 156 and 158 to operate the links 124 to steer the boring unit 32. The direction and degree of deflection is shown by the coil potentiometer arrangements shown in FIGS. 4 and 12.

Coupled to link 124(b) is coupling 200 which moves with the link 124(b). A threaded rod 202 is coupled as with nuts 204 to coupling 200 to also move with link 124(b). Connected to the opposite end of rod 202 is the wiper of a coil potentiometer 206 which is thus positioned within the potentiometer in accordance with the position of link 124(b). The coil of the potentiometer 206 is connected by leads 208 to an appropriate electrical circuit (not shown). The coil potentiometer 206 acts as a voltage divider and, depending upon the position of the wiper within the coil, produces a current which is fed to an indicator 210. One indicator which can be conveniently used is a trim tab indicator type IP 10100 manufactured by Bennett Marine Corp. 550 NW 12th Avenue, Deerfield Beach, Florida 33441. Depending upon the polarity and value of the applied signal, indicator 210 will be illuminated above or below a central point 212. The indicator segment 214 shows upward motion, the angle of the ascent being indicated by the position of the lamp segment lit with respect to the central point 212. Similarly the indicator segment 216 shows downward motion. The signals from the two vertical coil potentiometers 206 are both employed to drive the indicator 210. Although not shown, the links controlling left and right steering are also fitted to coil potentiometers which transmit their signals to indicator 218. Similarly, segment 222 shows rightward movement and segment 224 shows leftward movement, the degree of turn being indicated by the particular segment illuminated.

The correspondence between the boring unit 32 movement and the indicated directions of the joy sticks 194, 196 in FIG. 12 only hold true if the orientation of the boring unit 32 is as shown by the indicator lamps 188 (c), 188(d) and (188(e). If the boring unit 32 rotates 90° counter-clockwise as is shown by the indicator lights 188(c), 188(b) and 188(c) in FIG. 13, the result of using the joy sticks 194, 196 as indicated by the arrows would be incorrect movement. The movement of joy stick 194 in the direction of arrow 1 would not be to aim the boring unit 32 toward the surface but rather to direct it to move leftwardly. Similarly down, as with arrow 2, is rightward movement whereas right with arrow 3 by joy stick 196 would cause upward movement and left in the direction of arrow 4 is downward.

Figure 14:
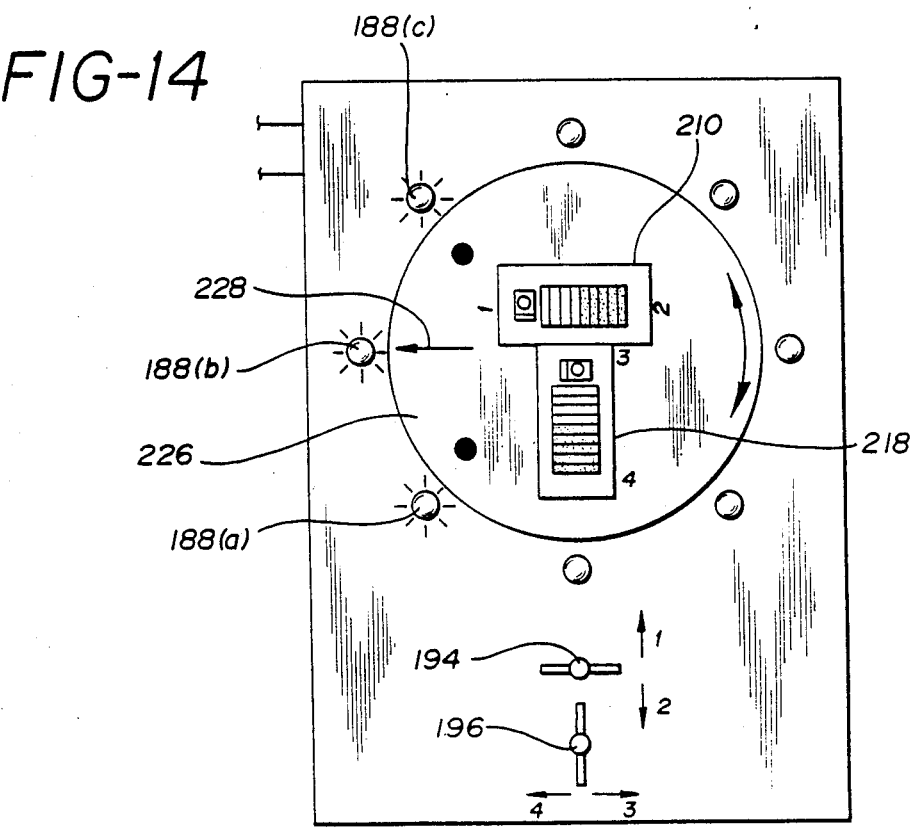
FIG. 14 shows the adjustment to the control panel made to account for the change in orientation of the penetrating tool of FIG. 1.

To eliminate the possible confusion, the central portion 226 of the control panel 192 is rotatable. Portion 226 is rotated so as to align central pointer 228 with the middle one of the three illuminated indicator lights 188, that is 188(b) as is shown in FIG. 14. Now movement of joy sticks 194, 196 will be correctly visually displayed to the operator. A further rotation of the boring unit 32 90° counter-clockwise will result in the one direction being down or a 180° reversal of the initial position.

Figure 15:
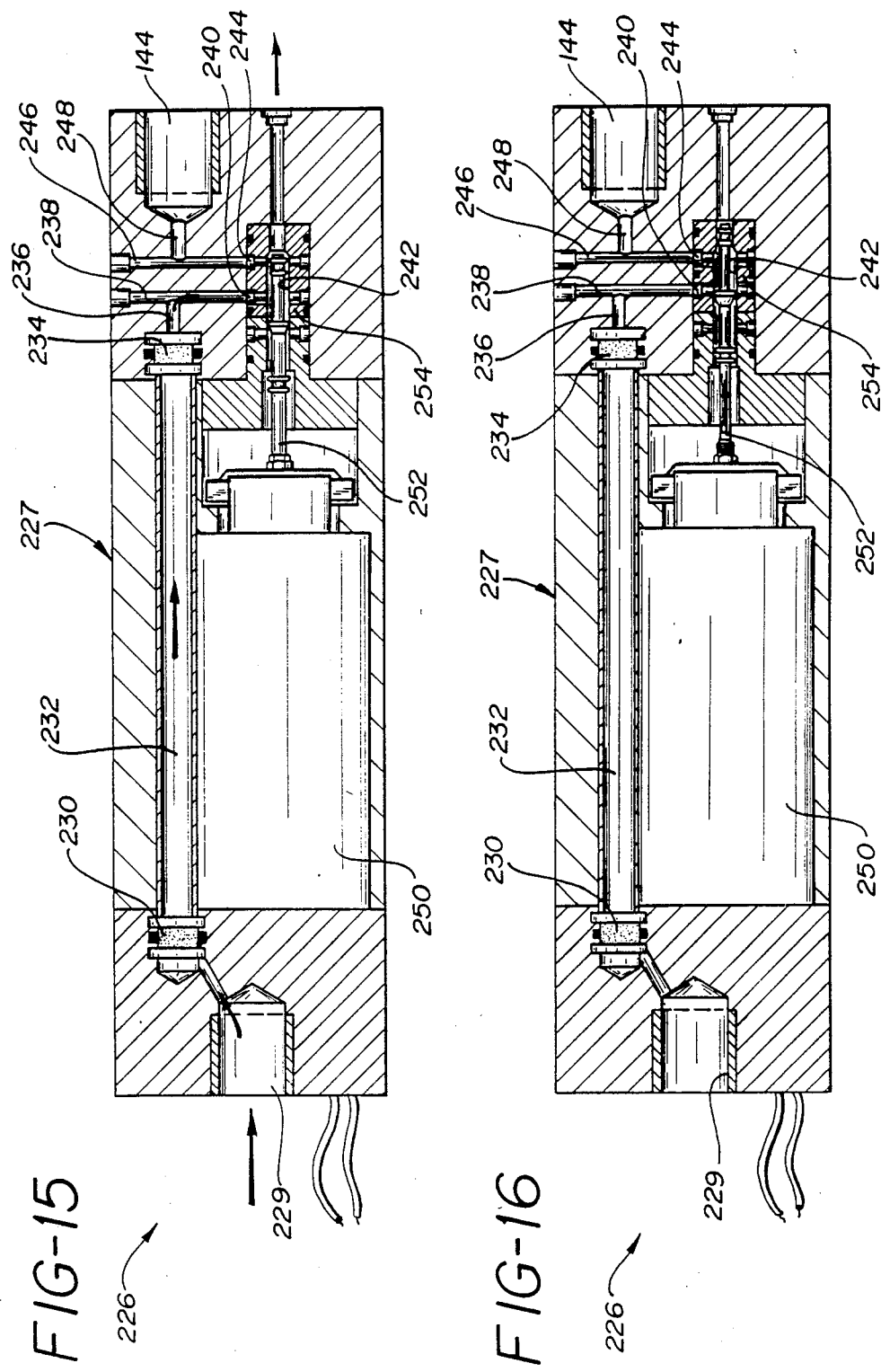
FIG. 15 is a side elevation, in section, of a solenoid operated control valve of the penetrating tool of FIG. 1 shown in a flow condition.
Figure 16:
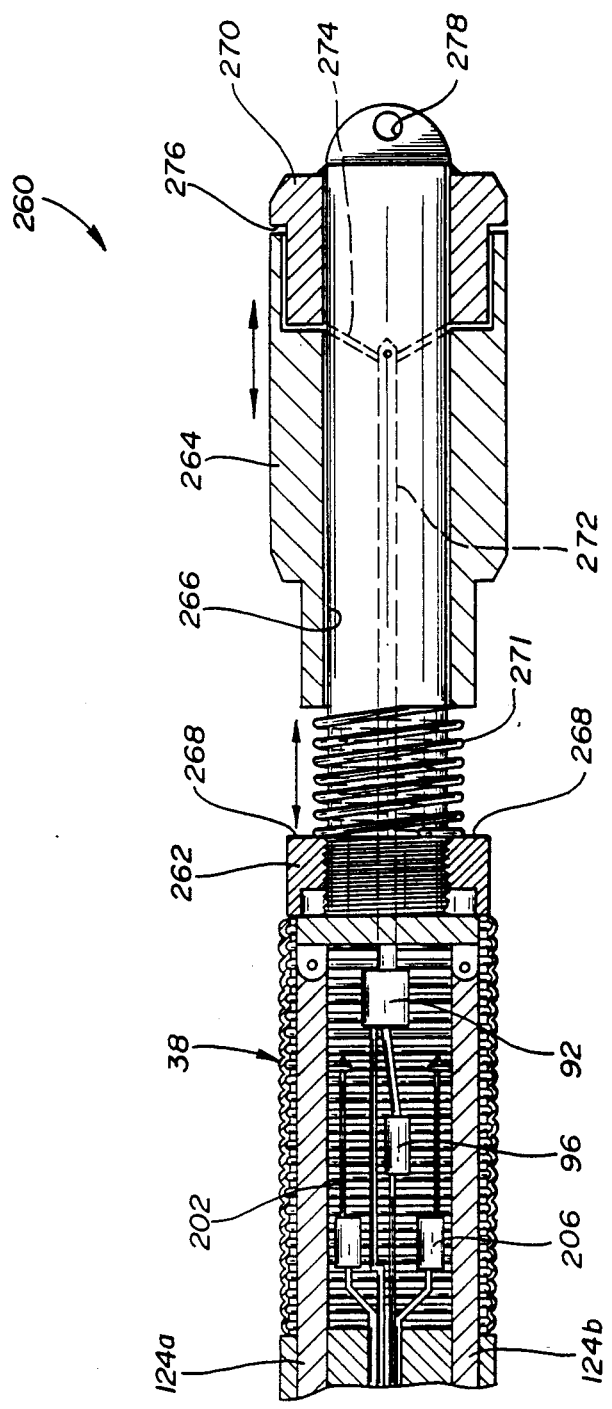
FIG. 16 is a side elevation, in section, of the control valve of FIG. 15 operated by the solenoid to the cut-off condition.

Turning now to FIGS. 15 and 16, the hydraulic cylinder 227 used to provide the fluid to inlet port 144 of the steering portion 38 is shown. Although only one cylinder 227 is shown, it should be understood that there are four cylinders 227 arranged in a circle in housing 41 to the left of indicator portion 40. The two cylinders 227 for the vertical-direction movement are shown in FIG. 4, but the horizontal-movement control cylinders have been omitted for the sake of clarity. Hydraulic fluid is fed to inlet 229 and passes via filter 230 to passage 232 and a further filter 234 to passages 236 and 238 and into chamber 242 via port 240. From chamber 242, the fluid flows via port 244 through passages 246, 248 to inlet port 144. This flow is possible because the valve plunger 254 is in the retracted position to the left of port 240 as is shown in FIG. 15. In response to an electrical signal on lines 256, solenoid 250 is operated to advance valve plunger 254 to the right of port 240 blocking all further flow of hydraulic fluid to inlet port 144 as shown in FIG. 16. Individual ones of the pairs of cylinders 227 will be operated in accordance with the desired direction of movement of boring unit 32.

After boring unit 32 has arrived at its desired location, it can be used to draw a new utility item through the newly created bore by installing the pulling eye 114 of FIG. 6 and re-reeling the service cable 42. If it is desirable or necessary to increase the diameter of the bore this can be done on the return by use of a back reamer as shown in FIG. 18. Nose portion 34 and hammer portion 36 are removed by unscrewing the hammer portion 36 from the threaded stud 88 of the steering portion 38. Back reamer 260 is now threadedly engaged to threaded stud 88 by means of internally-threaded anvil 262. A hammer portion 264 is arranged for reciprocating movement concentrically along support tube 266 to apply force to surfaces 268 of anvil 262 at the end of its forward stroke and to approach collar 270 at the end of its rearward stroke.

A compression spring 271 serves to return hammer portion 264 to its rearward position adjacent collar 270 and apply the force of hammer portion 264 to surfaces 268 of anvil 262. Fluid is fed via tube 272 to the passages 274 and interspaces 276 between hammer portion 264 and collar 270 forcing hammer portion 264 forward to strike surfaces 268 of anvil 262 and moving the entire assembly to the left in FIG. 18. Since the diameter of hammer portion 264 is greater than that of nose body 60, the bore is enlarged. The fluid escaping the interspaces 276 is available to lubricate the passage of the back reamer 260. The trailing utility item that is fastened to pulling eye 278 of collar 270 acts as a break for the returning hammer portion 264 to prevent an impact with collar 270 which could drive the back reamer 260 in the wrong direction.

All essential fluid, hydraulic and electrical conductors are housed in the service cable 42 fastened to the housing 41. Beyond the location of the hydraulic cylinders 227, housing 41 is decreased in outside diameter as at 280 and the outer surface formed with a series of ridges 282. At the end of the body portion, a plate 284 is fixed across the opening dividing same in half so that the various lines, tubes and conductors can pass over either face of plate 284 and enter the boring unit housing 41.

An aperture 286 is placed in plate 284 for purposes to be described below. Service cable 42 is prepared so that the various lines, tubes and conductors are separated and extend beyond the outer jacket 290 of service cable 42 so that they can pass along plate 284 into the boring unit 32 for attachment to their respective components. The end of outer jacket 290 is brought up against end 288 of housing 41 over the ridges 282 in the reduced-diameter portion 280 and clamped thereto by use of a stainless steel hose clamp 292 of a construction well known in the art.

Figure 17:
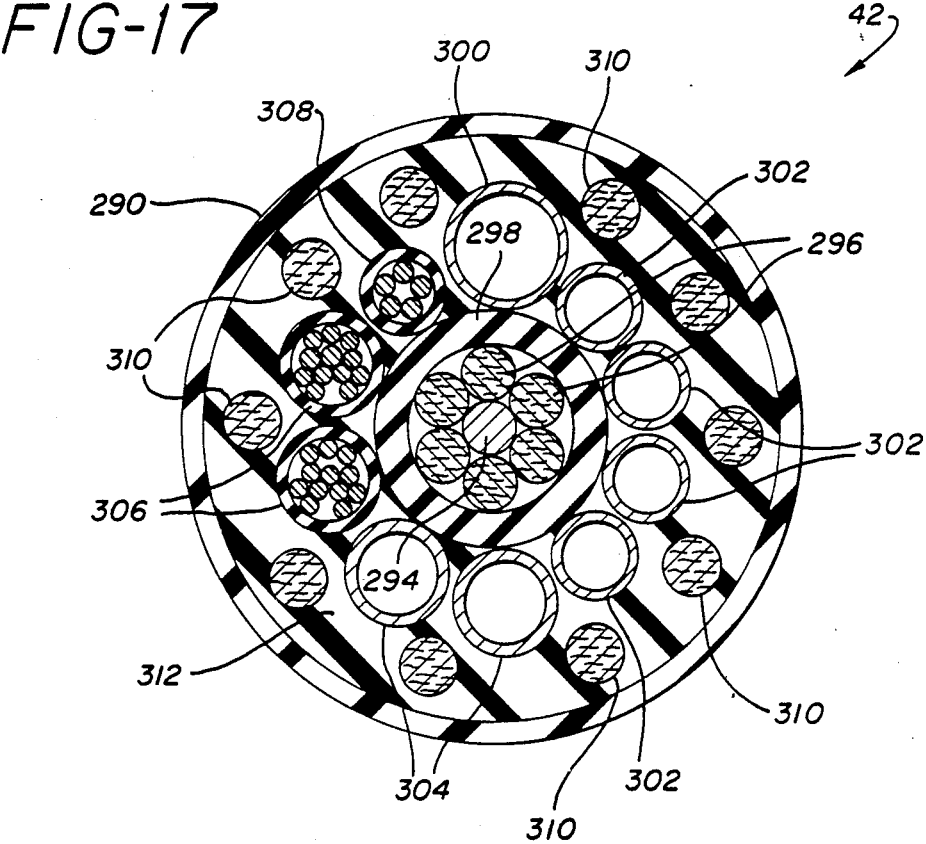
FIG. 17 is a cross-section of the service cable of the penetrating tool system of FIG. 1.

The makeup of service cable 42 is best appreciated from a consideration of FIG. 17. At the center of service cable 42 is a steel wire 294 which is attached to plate 284 by means of aperture 286. The wire 294, having a diameter of about 0.250 inches, can be used to pretension the service cable 42 and thus reduce the tendency of the boring unit 32 to rotate by providing a more rigid trailing cable and to provide the main pulling line for drawing the boring unit 32 or back reamer 260 back through the newly-created bore whether by themselves or with a utility item fastened thereto to decrease the forces otherwise applied directly to the weaker service cable alone. Steel wire 294 is surrounded by six fiberglass rods also having a diameter of about 0.250 inches. These rods are applied with a slight twist (1 wrap per 9 lineal feet) rather than extending in parallel with steel wire 294. These rods provide crush support and when used with further fiberglass rods having a reverse or opposite twist tend to keep service cable 42 from rotating. Steel wire 294 and fiberglass rods 296 are surrounded by an extruded jacket 298. Along the outer surface of jacket 298 are arranged the 2,000-pounds-per-square-inch working pressure drill mud line 300 which couples to line 98; four 2,000-pounds-per-square-inch working pressure hydraulic lines 302 which are coupled to inlets 229 of hydraulic cylinders 227; two 5,000-pounds-per-square-inch working pressure air lines 304, one of which couples to line 100, the other remaining as a spare; two electrical cables 306, each composed of six pair of 22-gauge stranded conductors--four pair used for the solenoids 250 of the hydraulic cylinders 250, two pair coupled to conductors 208 of the coil potentiometers 206, two further pair for the conductors of the horizontal coil potentiometers (not shown) and four pair used to couple the mercury switches 170 to the indicator lamps 188; and two electrical conductors 308 number 12 wire rated at 600 volts. Surrounding these hoses and conductors is a second ply of ten 0.250-inch fiberglass rods 310 applied with a twist direction opposite to that of fiberglass rods 294 and of a greater twist being one wrap in 4.5 lineal feet. The net effect of these two counter-twist plys of fiberglass rods is to support and strengthen the cable 42 and to resist any tendency to rotate in either direction. Also, as stated above, the steel wire 292 can be tensioned before any tension is applied to the overall cable 42 and this pre-tensioning tends to make the cable 42 more rigid also preventing rotation during reeling or unreeling.

The cable 42 is further protected and reinforced by pressure extruding a polyethylene interior jacket 312 and a polyurethane wear jacket 290 over the cable core and components.

The unreeling of the supply cable 42 is generally controlled by the boring unit 32. As it advances, it pulls the supply cable 42 after it. However, the longer the supply cable 42 runs, the greater is the need for a power assist in inserting supply cable 42 into the bore. The movement of the boring unit 32 acts as a limit and not too much force can be applied to supply cable 42. The same is not true when the boring unit 32 is being withdrawn from the bore and is pulling a utility item with it.

The application of an excessive amount of tension to the supply cable 42 as it is rereeled could separate the supply cable 42 from the boring unit 32 or perhaps injure or break some of the interconnectors without the operator knowing it. To safely control re-reeling, a cable-reeling system 44 capable of monitoring the tension applied to the supply cable 42 is used. As best seen in FIG. 1, supply cable 42 is wound upon reel 314 having circular end plates attached to an axle 317 supported by members 316 mounted upon a first skid 318. The end of supply cable 42 is coupled or attached to hub 315 by any coinventional means. Also mounted upon skid 318 is a drive motor 320 which drives reel 314 by means of a belt or chain 322 about hub 324. Skid 318 is mounted upon a further skid 326 with four links 328 pinned at both ends as with pins 330. Only the front two links 328 are visible in FIG. 1, but two similar links 328 are positioned on the other side of skids 318, 326. The mounting of links 328 with pins 330 allows relative movement of skid 318 with respect to skid 326 while maintaining them generally parallel with each other. Mounted upon skid 326 is a tension gauge 332 also coupled to skid 318 by shaft 334. The actual tension between skids 318 and 326 is shown on meter 336. The tension value read by meter 336 will be related to the tension applied to supply cable 42 by the reeling system 44 and will be a function of the speed of reel 314 and the tension applied to the supply cable 42. By changing the reel speed of reel 314 and the tension applied, tension and reel speed can be increased or decreased and the cable tension read on meter 336.

Figure 19:
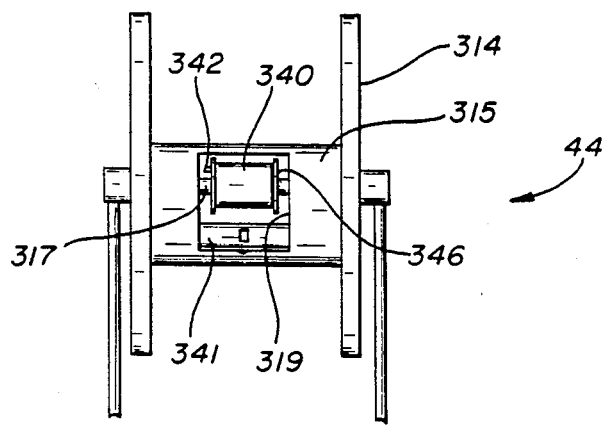
FIG. 19 is a fragmentary front elevation of a reeling system for use in reeling and unreeling the service cable with a separate reel mechanism to pre-tension the steel wire of the service cable.

In order to control the tension applied to the steel wire 294 separately, a hand-operated reel 340 having circular end plates 346 is mounted inside of the hub 315 of reel 314 on axle 317 (see FIG. 19). An access door 341 in hub 315 is opened and the steel wire 294 end is attached to reel 340, and by turning the manual crank 342, the tension in the steel wire 294 can be preadjusted. The reel 340 can be locked to rotate with the reel 314 by any conventional means after the steel wire is pretensioned. The entire supply cable 42 can then be wound upon reel 314.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

The embodiments of the invention in which an exclusive property or privilege is claimed are defined as follows:

1. A device to pre-tension a tension member in a supply cable independently of any tension applied to said supply cable comprising:
    a main reel having a hollow central hub and two end plates, one mounted at each end of said hub;
    support means supporting said main reel;
    drive means coupled to said main reel for selectively rotating said main reel to pay out or take up a supply cable coupled to said hub of said main reel;
    an auxiliary hub and two auxiliary circular end plates, one mounted adjacent each of the two ends of said auxiliary hub mounted within said hollow central hub of said main reel;
    an axle extending through said auxiliary hub and said auxiliary end plates from a first end attached to one of said two main reel end plates to a second end attached to the second one of said two main reel end plates so that said auxiliary hub and auxiliary end plates can be rotated about said axle;
    second drive means coupled to one of said two auxiliary end plates to selectively rotate said auxiliary hub and said auxiliary end plates independently of said main reel;
    first means coupling said tension member to said auxiliary hub whereby the selective operation of said second drive means rotates said auxiliary hub to pre-tension said tension member independently of the rotation of the main reel.

2. A device to pre-tension a tension member in a supply cable independently of any tension applied to said supply cable comprising:
    a main reel having a hollow central hub and two end plates, one mounted at each end of said hub to receive thereon a supply cable comprising a tension member and supply lines in a protective sheath;
    support means supporting said main reel for rotation about an axis extending through said central hub and said end plates;
    first drive means coupled to said main reel for selectively rotating said main reel to pay out or take up a supply cable coupled to said hub of said main reel;
    first coupling means to couple said supply cable to said hub of said main reel;
    an auxiliary reel having an auxiliary hub and two auxiliary circular end plates, one mounted adjacent each of the two ends of said auxiliary reel mounted within said hollow central hub of said main reel and lockable to the main reel;
    an axle extending through said auxiliary reel from a first end attached to one of said two main reel end plates to a second end attached to the second one of said two main reel end plates to permit said auxiliary reel to be rotated about said axle independently of the rotation of said main reel;
    second drive means coupled to said auxiliary reel to selectively rotate said auxiliary reel to take up the tension member coupled to said hub of the auxiliary reel;
    whereby the operation of said second drive means applies a first tension level to said tension member and the operation of said first drive means in the direction of the supply cable take-up after locking the auxiliary reel to the main reel causes the pre-tensioned supply cable to be wound upon said main reel.

* * * * *